United States Patent
Satori et al.

(10) Patent No.: US 12,264,438 B2
(45) Date of Patent: Apr. 1, 2025

(54) SOFT WET PRESSED FACIAL TISSUE

(71) Applicant: Kimberly-Clark Worldwide, Inc., Neenah, WI (US)

(72) Inventors: Christopher L. Satori, Hortonville, WI (US); Kevin J. Vogt, Neenah, WI (US); Mark W. Sachs, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 235 days.

(21) Appl. No.: 17/914,834

(22) PCT Filed: Mar. 27, 2020

(86) PCT No.: PCT/US2020/025247
§ 371 (c)(1),
(2) Date: Sep. 27, 2022

(87) PCT Pub. No.: WO2021/194504
PCT Pub. Date: Sep. 30, 2021

(65) Prior Publication Data
US 2023/0143624 A1 May 11, 2023

(51) Int. Cl.
*D21H 27/00* (2006.01)
*D21H 21/14* (2006.01)
*D21H 27/40* (2006.01)

(52) U.S. Cl.
CPC ......... *D21H 27/005* (2013.01); *D21H 21/146* (2013.01); *D21H 27/40* (2013.01)

(58) Field of Classification Search
CPC ............ B32B 2307/50; B32B 2307/54; B32B 2307/546; B32B 2307/5825;
(Continued)

(56) References Cited

U.S. PATENT DOCUMENTS 9,410,290 B2 8/2016 Hermans et al.
2005/0045293 A1 3/2005 Hermans et al.
(Continued)

FOREIGN PATENT DOCUMENTS

KR 1020150066543 A 6/2015
KR 1020170105629 A 9/2017
(Continued)

OTHER PUBLICATIONS

Co-pending U.S. Appl. No. 17/918,609, filed Oct. 13, 2022, by Hanke et al. for "Low Stiffness Multi-Ply Tissue Product".
(Continued)

*Primary Examiner* — Dennis R Cordray
*Assistant Examiner* — Matthew M Eslami
(74) *Attorney, Agent, or Firm* — KIMBERLY-CLARK WORLDWIDE, INC.

(57) ABSTRACT

Disclosed are multi-ply tissue products, particularly wet pressed facial tissue products that have been recreped. For example, disclosed are tissue products prepared from wet pressed tissue webs that have been recreped using a print-crepe process that deposits a latex polymer on at least one of the outer surfaces of the tissue web. The tissue products have improved strength and softness, such as a geometric mean tensile strength (GMT) greater than about 1,400 g/3", a geometric mean tensile energy absorption (GM TEA) of about 20 gocm/cm2 or greater and a TS7 value less than about 16.0. In certain instances, the tissue products also have a low degree of stiffness and a relatively smooth surface, such as a Stiffness Index less than about 8.00 and a TS750 value less than about 20.0.

12 Claims, 7 Drawing Sheets

(58) Field of Classification Search
CPC ........ B32B 2307/718; B32B 2307/744; B32B 2307/75; B32B 2535/00; B32B 2555/00; D21H 27/002; D21H 27/30; A47K 10/16
See application file for complete search history.

(56) References Cited

U.S. PATENT DOCUMENTS

| | | |
|---|---|---|
| 2006/0130986 A1 | 6/2006 | Flugge-Berendes et al. |
| 2008/0073045 A1* | 3/2008 | Dyer .................... A47K 10/16 162/158 |
| 2009/0301675 A1 | 12/2009 | Edwards et al. |
| 2010/0159200 A1 | 6/2010 | Soerens et al. |
| 2016/0319488 A1 | 11/2016 | Hermans et al. |
| 2019/0309482 A1* | 10/2019 | Zawadzki ............ D21H 27/002 |

FOREIGN PATENT DOCUMENTS

| | | |
|---|---|---|
| KR | 1020170106985 A | 9/2017 |
| WO | 2016176035 A1 | 11/2016 |
| WO | 2019108188 A1 | 6/2019 |

OTHER PUBLICATIONS

Co-pending U.S. Appl. No. 17/914,838, filed Sep. 27, 2022, by Satori et al. for "Soft Through-Air Dried Facial Tissue".

* cited by examiner

SOFT WET PRESSED FACIAL TISSUE

BACKGROUND OF THE DISCLOSURE

In the manufacture of tissue products, such as facial tissue, bath tissue, paper towels and the like, the tissue sheet is formed by depositing an aqueous suspension of papermaking fibers onto a forming fabric. The web is then transferred to a papermaking felt and dewatered as it passes through a pressure nip created between a pressure roll and a Yankee dryer as the wet web is transferred to the Yankee surface. Free water expressed from the web in the pressure nip is absorbed and carried away by the felt as the web transfers to the Yankee surface. The web is then final dried on the surface of the Yankee and subsequently creped to impart bulk and softness to the resulting tissue sheet. This method of making tissue sheets is commonly referred to as "wet-pressing" because of the method used to dewater the wet web.

The wet-pressing method has several distinct drawbacks. First, pressing the tissue web while wet densifies the web. Second, to restore a portion of the original web density it is necessary to crepe the web, which requires a large amount of energy to dry the web from a consistency of about 35 percent to a final dryness of about 95 percent. Third, because the web is densified by wet pressing immediately prior to drying, there is limited opportunity to impart structure to the web, which limits the tissue maker's ability to increase the bulk or modify the cross-machine direction properties of the web. As such, wet pressed tissue products typically have relatively modest bulk and relatively cross-machine direction properties, such as stretch and tensile energy absorption.

Therefore, there is a need for a method of making wet pressed tissue sheets having improved bulk and cross-machine direction properties, such as increased cross-machine direction stretch and tensile energy absorption.

SUMMARY OF THE DISCLOSURE

The present disclosure provides wet pressed tissue products having improved product properties such as softness, surface texture strength. The improvements in strength include improvement in cross-machine direction (CD) tensile properties such as tensile strength, tensile energy absorption and stretch. Cross-machine direction (CD) properties are important because tissue products often fail in the cross-machine direction because it is often the weaker of the two product orientations (cross and machine directions). Surprisingly the increased strength does not detract from the softness, such that tissue products generally have a TS7 less than about 16.0, more preferably less than about 14.0, and still more preferably less than about 12.0, such as from about 8.0 to about 16.0 even at geometric mean tensile (GMT) strengths greater than about 1,400 g/3". Previously it was believed that such softness levels were only obtainable by relatively weak products, such as those having tensile strengths of about 1,000 g/3" or less.

Accordingly, in one embodiment the present disclosure provides a multi-ply tissue product, such as a tissue product comprising two or more wet pressed tissue plies, the product having a geometric mean tensile (GMT) greater than about 1,400 g/3", such as from about 1,400 to about 2,000 g/3" and a TS7 less than about 16.0 and more preferably less than about 14.0. In certain instances, the inventive tissue products may have a relatively smooth surface, such as a TS750 less than about 20.0, such as from about 12.0 to about 20.0.

In other embodiments the present invention provides a wet pressed tissue product comprising a first wet pressed tissue ply and a second wet pressed tissue ply, the product having a basis weight from about 35 to about 45 grams per square meter (gsm), a geometric mean tensile (GMT) from about 1,400 to about 2,000 g/3" and a TS7 from about 8.0 to about 16.0.

In yet another embodiment the present invention provides a multi-ply through-air dried tissue product having a geometric mean tensile (GMT) from about 1,400 to about 1,800 g/3", a TS7 from about 8.0 to about 16.0 and a TS750 from about 12.0 to about 20.0. In certain instances, the foregoing tissue product may have a basis weight from about 35 to about 45 gsm and a bulk greater than about 8.0 cc/g, such as from about 8.0 to about 12.0 cc/g.

In another embodiment the present invention provides a multi-ply tissue product comprising a first and a second wet pressed tissue plies having first and second outer surfaces, a creping composition disposed on the first outer surface and a latex polymer disposed on the second outer surface. The first and second wet pressed tissue plies may be plied together in facing arrangement such that the surface comprising the latex polymer face one another and the surface of the product contacted by a user in-use comprises the creping composition. In certain instances, the creping composition may comprise a non-fibrous olefin polymer and the latex polymer may comprise a vinyl acetate-ethylene latex polymer.

In still other embodiments the present disclosure provides a method of producing a tissue product comprising the steps of dispersing wood pulp fibers to form a first fibrous slurry, pumping the first fibrous slurries to a headbox, depositing the first fibrous slurry from the headbox onto a foraminous surface to form a fibrous web, pressing the fibrous web against a felt to form a partially dewatered web having a consistency from about 40 to about 50 percent, adhering the partially dewatered web against a Yankee dryer, drying the web to a consistency of greater than about 90 percent and creping the dried web to remove it from the Yankee dryer. The dried and creped tissue web may then be subjected to a second creping step by applying a latex polymer to the first outer surface of the dried tissue web, adhering the first outer surface of the dried tissue web to a rotary dryer and creping the tissue web from the rotary dryer.

In certain instances, plies produced according to the proceeding method may be plied together to form a multi-ply tissue product, particularly facial tissue products that may be folded and dispensed from a container as individual sheets. When plying multiple plies together the individual plies may be brought into facing arrangement with one another such that the ply surfaces having the latex polymer disposed thereon may face one.

DEFINITIONS

Figure 1:
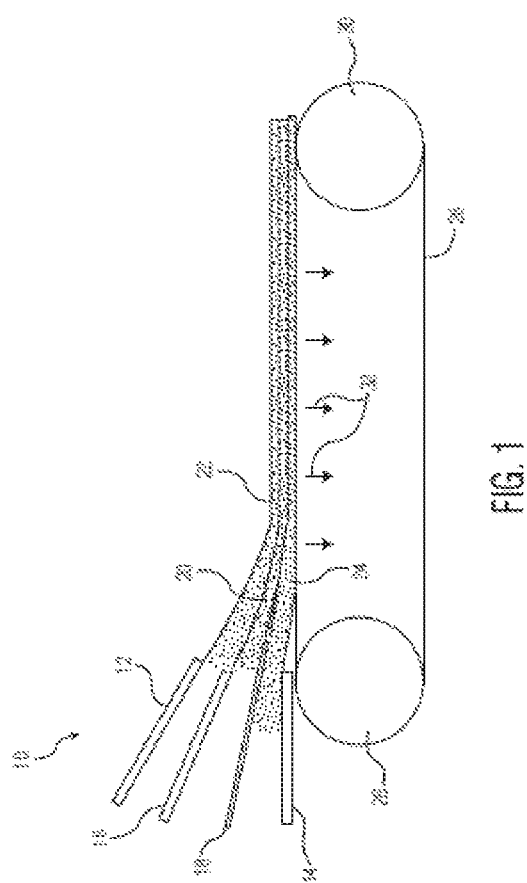
FIG. 1 illustrates one embodiment for forming a multi-layered tissue web according to the present invention.

As used herein the term "Wet pressed" generally refers to a tissue web manufacturing process in which prior to the nascent tissue web being transferred to the surface of a rotating drying cylinder, such as a Yankee dryer, water is expressed from the web and absorbed by a felt to yield a partially dewatered web. The partially dewatered web, typically having a consistency of about 40 percent, is adhered to the surface of a rotating drying cylinder with the aid of a creping composition and dried consistency of at least about 95 percent while on the hot surface of the dryer. After drying the web is removed from the dryer surface by creping.

As used herein the term "Basesheet" refers to a tissue web formed by any one of the papermaking processes described herein that has not been subjected to further processing, such as embossing, calendering, treatment with a binder or softening composition, perforating, plying, folding, or rolling into individual rolled products.

As used herein the term "Tissue Product" refers to products made from basesheets and includes, bath tissues, facial tissues, paper towels, industrial wipers, foodservice wipers, napkins, medical pads, and other similar products.

As used herein the term "Ply" refers to a discrete tissue web used to form a tissue product. Individual plies may be arranged in juxtaposition to each other.

As used herein, the term "Layer" refers to a plurality of strata of fibers, chemical treatments, or the like, within a ply. The term "Layered Tissue Web" generally refers to a tissue web formed from two or more layers of aqueous papermaking furnish. In certain instances, the aqueous papermaking furnish forming two or more of the layers comprise different fiber types.

As used herein the term "Basis Weight" generally refers to the conditioned weight per unit area of a tissue and is generally expressed as grams per square meter (gsm). Basis weight is measured as described in the Test Methods section below. While the basis weights of tissue products prepared according to the present invention may vary, in certain embodiments the products have a basis weight greater than about 30 gsm, such as greater than about 35 gsm, such as greater than about 40 gsm, such as from about 30 to about 45 gsm, such as from about 35 to about 40 gsm.

As used herein, the term "Caliper" refers to the thickness of a tissue product, web, sheet or ply, typically having units of microns (μm) and is measured as described in the Test Methods section below. While caliper may vary amongst tissue products prepared according to the present invention, in certain embodiments, tissue products may have a caliper greater than about 200 μm, such as greater than about 225 μm, such as greater than about 250 μm, such as from about 200 to about 270 μm.

As used herein, the term "Bulk" refers to the quotient of the caliper (μm) divided by the bone dry basis weight (gsm). The resulting bulk is expressed in cubic centimeters per gram (cc/g). Tissue products prepared according to the present invention may, in certain embodiments, have a bulk greater than about 8.0 cc/g, more preferably greater than about 9.0 cc/g and still more preferably greater than about 10.0 cc/g, such as from about 8.0 to about 12.0 cc/g.

As used herein, the term "Slope" refers to the slope of the line resulting from plotting tensile versus stretch and is an output of the MTS TestWorks™ in the course of determining the tensile strength as described in the Test Methods section herein. Slope typically has units of kilograms (kg) and is measured as the gradient of the least-squares line fitted to the load-corrected strain points falling between a specimen-generated force of 70 to 157 grams (0.687 to 1.540 N).

As used herein, the term "Geometric Mean Slope" (GM Slope) generally refers to the square root of the product of machine direction slope and cross-machine direction slope. While the GM Slope may vary amongst tissue products prepared according to the present invention, in certain embodiments, tissue products may have a GM Slope less than about 12.0 kg, such as less than about 10.0 kg, such as from about 8.0 to about 12.0 kg, such as from about 8.0 to about 10.0 kg.

As used herein, the term "Geometric Mean Tensile" (GMT) refers to the square root of the product of the machine direction tensile strength and the cross-machine direction tensile strength of the web. The GMT of tissue products prepared according to the present invention may vary, however, in certain instances the GMT may be about 1,400 g/3" or greater, such as about 1,500 g/3" or greater, such as about 1,600 g/3" or greater, such as from about 1,400 about 2,000 g/3".

As used herein, the term "Stiffness Index" refers to the quotient of the geometric mean tensile slope, defined as the square root of the product of the MD and CD slopes (having units of kg), divided by the geometric mean tensile strength (having units of grams per three inches).

Stiffness Index =

$$\frac{\sqrt{MD \text{ Tensile Slope (kg)} \times CD \text{ Tensile Slope (kg)}}}{GMT(g/3")} \times 1,000$$

While the Stiffness Index of tissue products prepared according to the present invention may vary, in certain instances the Stiffness Index may be less than about 8.00, such as less than about 7.00, such as less than about 6.00, such as from about 5.00 to about 8.00, such as from about 5.00 to about 7.00.

As used herein, the term "TEA Index" refers the geometric mean tensile energy absorption (having units of g·cm/cm$^2$) at a given geometric mean tensile strength (having units of grams per three inches) as defined by the equation:

$$TEA \text{ Index} = \frac{GMTEA(g \cdot cm/cm^2)}{GMT(g/3")} \times 100$$

While the TEA Index may vary, in certain instances tissue products prepared according to the present invention have a TEA Index of about 1.50 or greater, such as about 1.60 or greater, such as from about 1.50 to about 2.00.

As used herein, the term "Wet/Dry Ratio" refers to the ratio of the wet cross-machine direction (CD) tensile strength to the dry CD tensile strength. Wet and dry CD tensile are measured as set forth in the Test Methods section below. The Wet/Dry Ratio of inventive tissue products may vary depending on several factors such as, for example, the creping composition and the amount of wet strength additive, however, in certain instances the inventive tissue products may have a Wet/Dry Ratio greater than about 0.20, such as greater than about 0.25, such as from about 0.20 to about 0.30.

As used herein, the term "Slough" generally refers to the undesirable sloughing off of bits of the tissue web when rubbed and is generally measured as described in the Test Methods section below. Slough is generally reported in terms of mass, such as milligrams (mg). While the Slough of inventive tissue products may vary, in certain instances tissue products prepared according to the present invention have a Slough of about 2.00 mg or less, such as about 1.50 mg or less, such as about 1.00 or less, such as from about 0.50 to about 2.00 mg.

As used herein, the term "TS750" generally refers to the smoothness of a tissue product surface measured using an EMTEC Tissue Softness Analyzer ("Emtec TSA") (Emtec Electronic GmbH, Leipzig, Germany) interfaced with a computer running Emtec TSA software (version 3.19 or equivalent). The units of the TS750 value are dB $V^2$ rms, however, TS750 values are often referred to herein without reference to units. Generally, the TS750 value is the magnitude of the peak occurring at a frequency between about 200 and 1,000 Hz, which is produced by vibration of the tissue product during the test procedure. Such vibrations are mainly caused by roughness and embossing. Generally, a lower TS750 value is indicative of a smoother surface.

As used herein, the term "TS7" generally refers to the softness of a tissue product surface measured using an EMTEC Tissue Softness Analyzer ("Emtec TSA") (Emtec Electronic GmbH, Leipzig, Germany) interfaced with a computer running Emtec TSA software (version 3.19 or equivalent). The units of the TS7 are dB $V^2$ rms, however, TS7 values are often referred to herein without reference to units. Generally, the TS7 is the magnitude of the peak occurring at a frequency between 6 and 7 kHz which is produced by vibration of the tissue product during the test procedure. Generally, a peak in this frequency range having a lower amplitude, and hence a lower TS7 value, is indicative of a softer tissue product.

DETAILED DESCRIPTION OF THE DISCLOSURE

The present inventors have now surprisingly discovered tissue products, particularly facial tissue products that may be folded and dispensed from a container as individual sheets, having improved strength and durability without a significant decrease in softness or surface smoothness. Accordingly, in certain embodiments, the present invention provides tissue plies and products incorporating the same that have been manufactured by adhering the nascent tissue ply, also referred to herein as a web, to a rotating dryer, such as a Yankee dryer, and creping the web from the dryer to remove it. In particularly preferred embodiments a latex binder is used to adhere the nascent tissue web to the dryer surface and is transferred to the web surface once it is removed from the dryer by creping.

Creping the nascent web to remove it from the rotating dryer disrupts fiber-fiber bonding increasing softness and decreasing the stiffness of the web. Of particular advantage, it has been discovered that the softness of the web is increased without substantially reducing the strength. More particularly, it has been discovered that the process shifts the normal strength-softness curve so as to create webs having unique softness and strength properties.

For example, the inventive tissue products have improved strength and durability, such as a GMT of about 1,400 g/3" or greater, such as about 1,500 g/3" or greater, such as about 1,600 g/3" or greater, such as from about 1,400 about 2,000 g/3", such as from about 1,400 to about 1,800 g/3". In other embodiments, the tissue products may have a geometric mean tensile energy absorption of about 20 g·cm/cm$^2$ or greater, such as about 22 g·cm/cm$^2$ or greater, such as about 24 g·cm/cm$^2$ or greater, such as from about 20 to about 32 g·cm/cm$^2$, such as from about 22 to about 30 g·cm/cm$^2$. Accordingly, the tissue products may have a TEA Index of about 1.50 or greater, such as about 1.75 or greater, such as from about 1.50 to about 2.00.

While the inventive tissue products have good strength and durability, they are generally soft, smooth and flexible. For example, the tissue products generally have a TS7 less than about 16.0 and more preferably less than about 14.0 and still more preferably less than about 12.0. In certain instances, the inventive tissue products may have a relatively smooth surface, such as a TS750 less than about 20.0, such as from about 12.0 to about 20.0. In still other instances the products may have a Stiffness Index less than about 8.00, such as less than about 7.00, such as less than about 6.00, such as from about 5.00 to about 8.00, such as from about 5.00 to about 7.00.

A comparison of the strength, softness and smoothness of various commercial and inventive tissue products is shown in Table 1, below. In one particularly preferred embodiment the present invention provides a multi-ply, such as a two-ply, tissue product, comprising a first and second wet pressed plies comprising a plurality of wood pulp fibers and a latex creping composition disposed on at least one outer surface of each of the plies. Preferably the tissue product has a GMT greater than about 1,400 g/3" and more preferably greater than about 1,500 g/3", a TS7 less than about 16.0 and a TS750 from about 12.0 to about 20.0.

TABLE 1

| | Plies | Wet Pressed | Basis Weight (gsm) | GMT (g/3") | GM Slope (kg) | CD Stretch (%) | Stiffness Index | TS7 | TS750 |
|---|---|---|---|---|---|---|---|---|---|
| Kleenex Trusted Care Facial Tissue | 2 | Y | 32.1 | 815 | 8.3 | 6.2 | 10.2 | 10.82 | 7.59 |
| Kleenex Ultra Facial Tissue | 3 | Y | 43.0 | 850 | 10.2 | 6.3 | 12.0 | 9.40 | 6.85 |

TABLE 1-continued

|  | Plies | Wet Pressed | Basis Weight (gsm) | GMT (g/3") | GM Slope (kg) | CD Stretch (%) | Stiffness Index | TS7 | TS750 |
|---|---|---|---|---|---|---|---|---|---|
| Kleenex Lotion Facial Tissue | 3 | Y | 46.0 | 1065 | 15.9 | 5.6 | 14.9 | 8.50 | 17.89 |
| Puffs Plus Lotion | 2 | N | 40.1 | 874 | 7.7 | 8.5 | 13.1 | 8.88 | 10.77 |
| Everyday Great Value Facial Tissue | 2 | Y | 33.2 | 596 | 11.1 | 3.7 | 18.6 | 10.56 | 16.07 |
| Everyday Great Value Ultra Facial Tissue | 3 | Y | 43.3 | 1140 | 22.6 | 3.3 | 19.8 | 11.15 | 16.40 |
| Everyday Great Value Lotion Facial Tissue | 2 | Y | 47.7 | 839 | 15.5 | 2.9 | 18.5 | 8.08 | 25.68 |
| Sample 1 | 2 | Y | 38.3 | 1450 | 9.1 | 13.4 | 6.3 | 15.51 | 17.09 |
| Sample 2 | 2 | Y | 38.0 | 1890 | 10.7 | 14.4 | 5.7 | 14.97 | 15.14 |
| Sample 3 | 2 | Y | 38.3 | 1582 | 9.2 | 14.2 | 5.8 | 8.43 | 14.71 |
| Sample 4 | 2 | Y | 38.9 | 1652 | 9.9 | 15.1 | 6.0 | 8.47 | 17.75 |
| Sample 5 | 2 | Y | 38.4 | 1881 | 10.5 | 13.7 | 5.6 | 9.92 | 18.76 |

Generally, the tissue products of the present invention a basis weight greater than about 30 gsm, such as greater than about 35 gsm, such as greater than about 40 gsm, such as from about 30 to about 45 gsm, such as from about 35 to about 40 gsm. At the foregoing basis weights the tissue products may have a bulk greater than about 8.0 cc/g, such as from about 8.0 to about 12.0 cc/g. In a particularly preferred embodiment, the present invention provides a two-ply wet pressed tissue product having a basis weight from about 35 to about 40 gsm and a bulk of at least about 8.0 cc/g.

In still other embodiments, the present disclosure provides tissue products having a high degree of stretch. For example, the products may have a geometric mean stretch (GM Stretch) of about 20 percent or greater, such as about 22 percent or greater, such as about 24 percent or greater, such as from about 20 to about 28 percent, such as from about 22 to about 26 percent. In other instances, the products may have improved cross-machine direction stretch (CD Stretch), such as a CD Stretch of about 10 percent or greater, such as about 12 percent or greater, such as from about 10 to about 16 percent, such as from about 12 to about 14 percent.

In yet other embodiments, the inventive tissue products may be flexible, such as having a geometric mean slope (GM Slope) less than about 12.0 kg, such as less than about 10.0 kg, such as from about 8.00 to about 12.00 kg, such as from about 8.00 to about 10.0 kg. The foregoing modulus may be achieved at even relatively high degrees of tensile strength, such as a GMT of about 1,400 g/3" or greater. As a result, the inventive tissue products generally have a low degree of stiffness, measured as Stiffness Index, such as a Stiffness Index less than about 8.0, such as less than about 7.0, such as less than about 6.0, such as from about 5.0 to about 8.0, such as from about 5.0 to about 7.0.

In certain embodiments tissue products may be formed from one or more basesheets, which may comprise a single homogenous or blended layer, or be multi-layered. In those instances where the basesheet is multi-layered it may comprise, two, three, or more layers. For example, the basesheet may comprise three layers such as first and second outer layers and a middle layer disposed there between. The layers may comprise the same or different fiber types. For example, the first and second outer layers may comprise short, low coarseness wood pulp fibers, such as hardwood kraft pulp fibers, and the middle layer may comprise long, low coarseness wood pulp fibers, such as northern softwood kraft pulp fibers.

In those instances where the web comprises multiple layers, the relative weight percentage of each layer may vary. For example, the web may comprise first and second outer layers and a middle layer where the first outer layer comprises from about 25 to about 35 weight percent of the layered web, the middle layer comprises from about 30 to about 50 weight percent of the layered web and the second outer layer comprises from about 25 to about 35 weight percent of the layered web.

Multi-layered basesheets useful in the present invention may be formed using any number of different processes known in the art, such as the process disclosed in U.S. Pat. No. 5,129,988, the contents of which are incorporated herein in a manner consistent with the present disclosure. One process for a forming multi-layered basesheet is illustrated in FIG. 1. A dilute aqueous suspension of papermaking fibers is dispersed from a headbox 10 having an upper headbox wall 12 and a lower headbox wall 14 and first and second dividers 16, 18. In this manner the headbox may be used to form a basesheet having outer layers 22, 24 and a middle layer 20, where each of the layers may comprise the same or different papermaking fibers.

To form the multi-layered basesheet, an endless traveling forming fabric 26, suitably supported and driven by rolls 28 and 30, receives the layered papermaking stock issuing from headbox 10. Once retained on fabric 26, the layered fiber suspension passes water through the fabric as shown by the arrows 32. Water removal is achieved by combinations of gravity, centrifugal force and vacuum suction depending on the forming configuration.

In certain embodiments the one or more layers of a multi-layered basesheet, such as the middle layer, may be formed without a substantial amount of inner fiber-to-fiber bond strength. In this regard, the fiber furnish used to form a given layer can be treated with a chemical debonding agent. The debonding agent can be added to the fiber slurry during the pulping process or can be added directly the fiber slurry prior to the headbox. Suitable debonding agents that may be used in the present invention include cationic debonding agents, particularly quaternary ammonium compounds, mixtures of quaternary ammonium compounds with polyhydroxy compounds, and modified polysiloxanes.

Suitable cationic debonding agents include, for example, fatty dialkyl quaternary amine salts, mono fatty alkyl tertiary amine salts, primary amine salts, imidazoline quaternary salts and unsaturated fatty alkyl amine salts. Other suitable debonding agents are disclosed in U.S. Pat. No. 5,529,665, the contents of which are incorporated herein in a manner consistent with the present disclosure. In one embodiment, the debonding agent used in the process of the present invention is an organic quaternary ammonium chloride, such as those available under the tradename ProSoft™ (Solenis, Wilmington, DE). The debonding agent can be added to the fiber slurry in an amount of from about 1.0 kg per metric tonne to about 15 kg per metric tonne of fibers present within the slurry.

Particularly useful quaternary ammonium debonders include imidazoline quaternary ammonium debonders, such as oleyl-imidazoline quaternaries, dialkyl dimethyl quaternary debonders, ester quaternary debonders, diamidoamine quaternary debonders, and the like. The imidazoline-based debonding agent can be added in an amount of between 1.0 to about 10 kg per metric tonne.

In other embodiments, a layer or other portion of the basesheet, including the entire basesheet, may optionally include wet or dry strength agents. As used herein, "wet strength agents" are materials used to immobilize the bonds between fibers in the wet state. Any material that when added to the tissue web at an effective level results in providing the basesheet with a wet geometric tensile strength:dry geometric tensile strength ratio in excess of 0.1 will, for purposes of this invention, be termed a wet strength agent.

Particularly preferred wet strength agents are permanent wet strength agents. Particularly preferred wet strength agents are water-soluble, cationic materials, particularly those that undergo a cross-linking or other curing reactions after they have been deposited on, within, or among the papermaking fibers. Of particular utility are the various polyamide-epichlorohydrin resins. These materials are low molecular weight polymers provided with reactive functional groups such as amino, epoxy, and azetidinium groups. Polyamide-epichlorohydrin resins sold under the tradename Kymene by Ashland, Inc. of Wilmington, DE, are particularly useful in this invention.

In other instances, the basesheet may optionally include a dry strength additive, such as carboxymethyl cellulose resins, starch-based resins, and mixtures thereof. Particularly preferred dry strength additives are cationic starches, and mixtures of cationic and anionic starches. In certain instances, the dry strength agent may comprise a commercially available modified starch such as marketed under the tradename RediBOND™ (Ingredion, Westchester, IL) or a commercially available carboxymethyl cellulose resin such as those marketed under the tradename Aqualon™ (Ashland LLC, Bridgewater, NJ).

The amount of wet strength agent or dry strength added to the pulp fibers can be at least about 0.1 dry weight percent, more specifically about 0.2 dry weight percent or greater, and still more specifically from about 0.1 to about 3 dry weight percent, based on the dry weight of the fibers.

Figure 2:
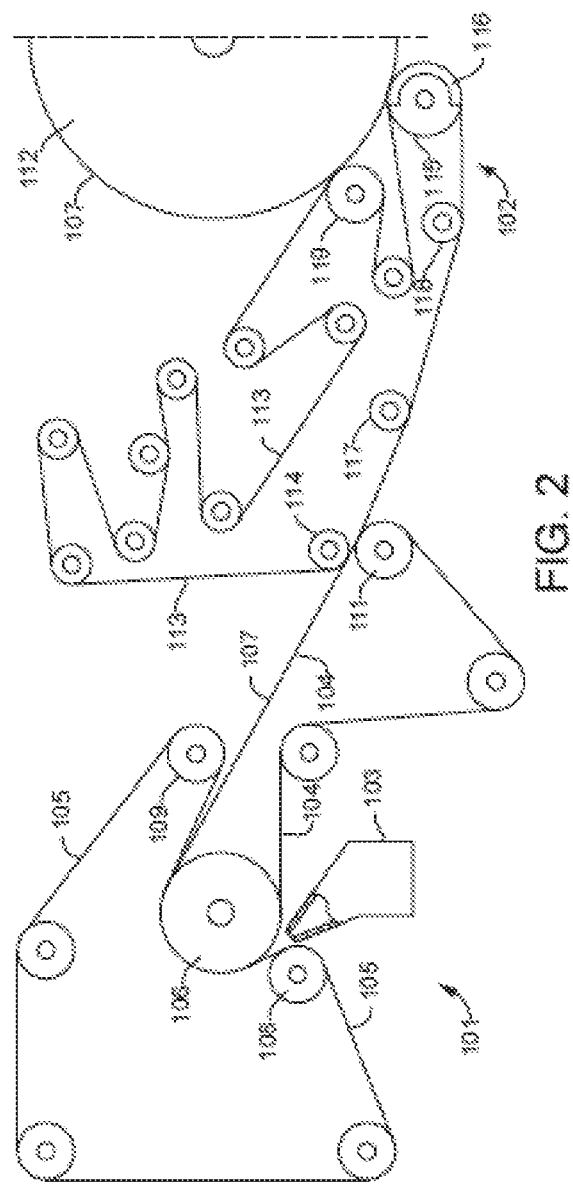
FIG. 2 illustrates one embodiment for forming a basesheet useful in the production of a tissue product according to the present invention.

Tissue basesheets useful in forming tissue products of the present invention are preferably formed by a wet pressed tissue manufacture, such as that illustrated in FIG. 2. The paper machine shown is a twin wire machine comprising a wet end 101 and a dry section 102. The wet end includes a headbox 103, a movable carrying forming wire 104, a movable covering forming wire 105 and a forming roll 106 which may be perforated and provided with suction means. Alternatively, the forming roll may be smooth. The headbox 103 supplies a single- or multi-layer flow of stock between the two moving forming wires 104, 105 for forming a paper web 107 by dewatering the stock. The two forming wires 104, 105 run together over the forming roll 106 and then in individual loops over a plurality of rolls arranged to impel, guide, align and stretch the carrying forming wire 104 and the covering forming wire 105. The rolls defining the path of the covering forming wire 105 include a breast roll 108 and, a short way after the forming roll 106, a guide roll 109 which can be termed a forward drive roll. The covering forming wire 105 leaves the carrying forming wire 104 and the paper web 107 either immediately before the wire 104 and paper web 107 diverge from the forming roll 106, or at a transfer suction box, not shown, or other transfer means located between forming roll 106 and forward drive roll 109. The carrying forming wire 104 runs to the drying section 102 where it leaves the paper web 107 by changing its direction of travel around a guide roll 111.

The drying section 102 comprises a Yankee dryer 112 having a relatively large diameter and a polished cylindrical surface. The Yankee dryer 112, preferably consisting of a cylinder covered by a hood (not shown), in which hot air is blown at high speed against the paper web 107. The paper web is creped from the Yankee dryer 112 by means of a creping doctor (not shown) to obtain the desired creping, after which the finished creped paper web is wound onto a roll. Further, the drying section 102 includes a felt 113 disposed upstream of the Yankee dryer 112 and travelling in a loop around several rolls and around a pick-up means, suitably in the form of a roll 114, located nearest the wet end and thereby in the vicinity of said guide roll 111 for the carrying forming wire 104, and a press roll 115 which presses against the Yankee dryer 112 and is provided with suction means 116 to dewater the paper web before the latter comes into contact with the Yankee dryer 112. The pick-up means may alternatively consist of a shoe. Further, two guide rolls 117, 118 are disposed between the pick-up roll 114 and press roll 115, said guide rolls 117, 118 deflecting with a small angle the direction of travel of the felt 113. A blind-drilled roll 119 is disposed after the press roll 115, in contact with Yankee dryer. The paper web 107 is transferred to the felt 113 at the point where this and the carrying forming wire 104 converge at the pick-up roll 114 and thereafter immediately diverge from each other. Suitable conditioning means (not shown) are disposed along the loop of the felt 113 in order to condition the felt prior to contact with the paper web.

As described above the web is mechanically dewatered by a compression nip while the wet web is in contact with a papermaking felt and thereafter dried with the aid of a Yankee dryer. As used herein, a "felt" is an absorbent papermaking fabric designed to absorb water and remove it from a tissue web. Papermaking felts of various designs are well known in the art. The water expressed from the wet web during compression is absorbed and carried away by the felt. Commonly, the compression nip is formed between a press roll and the surface of the Yankee dryer. Particularly suitable wet pressed tissue products in accordance with this invention are mechanically dewatered, final-dried on a Yankee dryer and once-creped.

Preferably the formed web is dried by transfer to the surface of a rotatable heated dryer drum, such as a Yankee dryer. In accordance with the present disclosure, the creping composition may be applied topically to the tissue web while the web is traveling on the fabric or may be applied to the surface of the dryer drum for transfer onto one side of the tissue web. In this manner, the creping composition is used to adhere the tissue web to the dryer drum. In this embodiment, as the web is carried through a portion of the rotational path of the dryer surface, heat is imparted to the web causing most of the moisture contained within the web to be evaporated. The web is then removed from the dryer drum by a creping blade.

In a particularly preferred embodiment, the formed web is transferred to the surface of the Yankee dryer by a suction pressure roll. Particularly suitable press loads for purposes of this invention can have a peak pressure of about 1.4 MPa or greater, more specifically from about 4 to about 8 MPa, and still more specifically from about 4 to about 6 MPa. The wet tissue web can be dewatered to a consistency of about 30 percent or greater, more specifically about 40 percent or greater, more specifically from about 40 to about 50 percent, and still more specifically from about 45 to about 50 percent. As used herein and well understood in the art, "consistency" refers to the bone dry weight percent of the web based on fiber.

In order to adhere the web to the surface of the dryer drum, a creping adhesive may be applied to the surface of the dryer drum by a spraying device. The spraying device may emit a creping composition made in accordance with the present disclosure or may emit a conventional creping adhesive. The web is adhered to the surface of the dryer drum and then creped from the drum using the creping blade. If desired, the dryer drum may be associated with a hood. The hood may be used to force air against or through the web.

In certain instances, the creping composition comprises at least one, and more preferably at least two, water-soluble polymers. For purposes herein, "water-soluble" means that the polymers dissolve completely in water to give a solution as opposed to a latex, dispersion, or suspension of undissolved particles. Suitable water soluble polymers may be selected from the group consisting of polyamidoamine-epichlorohydrin resin, polyamine-epichlorohydrin resin, polyvinyl alcohol, polyvinylamine, polyethyleneimine, polyacrylamide, polymethacrylamide, poly(acrylic acid), poly(methacrylic acid), poly(hydroxyethyl acrylate), poly(hydroxyethyl methacrylate), poly(n-vinyl pyrrolidinone), poly(ethylene oxide), hydroxyethyl cellulose, hydroxypropyl cellulose, guar gum, starch, agar, chitosan, alginic acid, carboxymethyl cellulose, highly branched polyamidoamines and their reaction product with epichlorohydrin and silyl-linked polyamidoamines.

The foregoing water soluble creping compositions can be applied to the Yankee surface as the sole active agent, or optionally with a release aid, and further optionally with a phosphate donor or other additives and resins, through the same spray boom or other coating applicator. As an option, water soluble creping compositions alone or in combination with release agents can be applied to the surface of the dryer in order to provide the appropriate adhesion to produce the desired crepe. As generally understood, the adhesive portion and any release aids used in the coating composition may migrate differentially as between a hot Yankee surface and the opposite web surface.

In other instances, the creping composition may comprise a thermoplastic resin, such as the composition disclosed in U.S. Pat. No. 7,807,023, the contents of which are incorporated herein in a manner consistent with the present disclosure. The thermoplastic resin may be contained, for instance, in an aqueous dispersion prior to application to the creping surface. In one particular embodiment, the creping composition may comprise a non-fibrous olefin polymer. The creping composition, for instance, may comprise a film-forming composition and the olefin polymer may comprise an interpolymer of ethylene and at least one comonomer comprising an alkene, such as 1-octene. The creping composition may also contain a dispersing agent, such as a carboxylic acid. Examples of particular dispersing agents, for instance, include fatty acids, such as oleic acid or stearic acid.

In one particular embodiment, the creping composition may contain an ethylene and octene copolymer in combination with an ethylene-acrylic acid copolymer. The ethylene-acrylic acid copolymer is not only a thermoplastic resin but may also serve as a dispersing agent. The ethylene and octene copolymer may be present in combination with the ethylene-acrylic acid copolymer in a weight ratio of from about 1:10 to about 10:1, such as from about 2:3 to about 3:2.

In a particularly preferred embodiment, the creping composition comprises an olefin polymer comprises an alpha-olefin interpolymer of ethylene and at least one comonomer selected from the group consisting of a $C_{4-20}$ linear, branched or cyclic diene, vinyl acetate, and a compound represented by the formula $H_2C=CHR$, wherein R is a $C_{1-20}$ linear, branched or cyclic alkyl group or a $C_{6-20}$ aryl group, or the alpha-olefin polymer comprises a copolymer of propylene with at least one comonomer selected from the group consisting of ethylene, a $C_{4-20}$ linear, branched or cyclic diene, and a compound represented by the formula $H_2C=CHR$, wherein R is a $C_{1-20}$ linear, branched or cyclic alkyl group or a $C_{6-20}$ aryl group.

Once a creped web having a creping composition disposed on a first outer surface is formed, the web is printed with a binder on its second outer surface and creped a second time. In this manner, the present invention provides a tissue product comprising a web having first and second outer surfaces, wherein the first outer surface comprises a creping composition and the second outer surface comprises a topically-applied binder, particularly a binder applied in a network. As used herein, the term "network" is used to describe any binder pattern that serves to bond the sheet together. The pattern can be regular or irregular and can be continuous or discontinuous.

Figure 3:
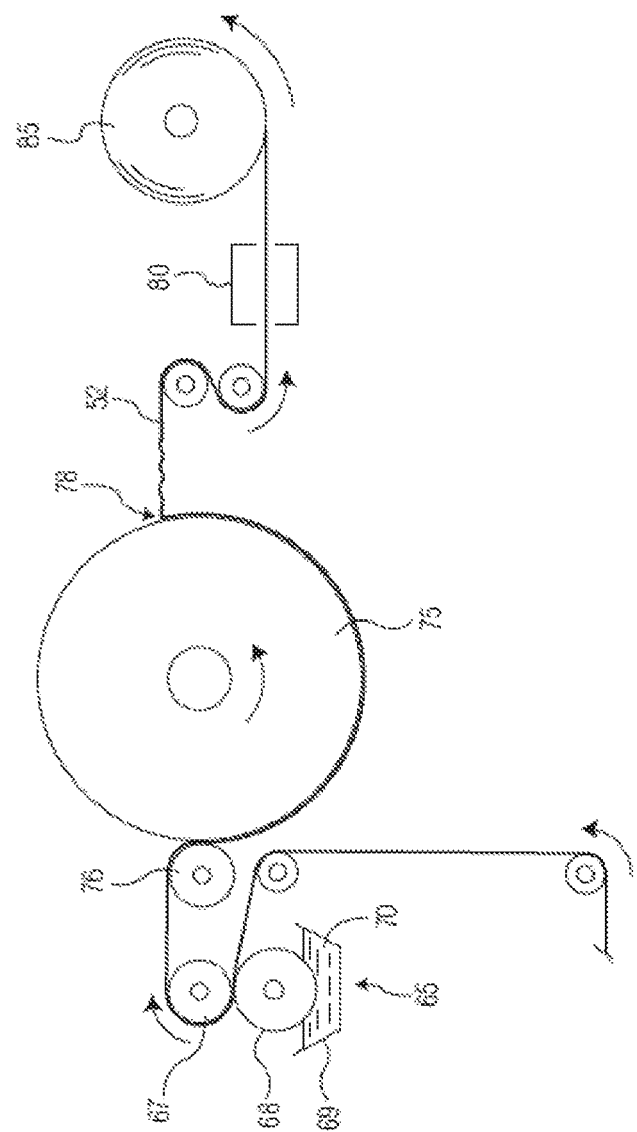
FIG. 3 illustrates one embodiment of a print-crepe process for producing a tissue product according to the present invention.

With reference now to FIG. 3, one embodiment of applying a binder material to one outer surface of a web is illustrated. Shown is paper web 52 passing through a binder material application station 65. Station 65 includes a transfer roll 67 in contact with a rotogravure roll 68, which is in communication with a reservoir 69 containing a suitable binder 70. Although gravure printing of the binder is illustrated, other means of applying the binder material can also be used, such as foam application, spray application, flexographic printing, or digital printing methods, such as ink jet printing, and the like. The rotogravure roll 68 applies binder material 70 to one side of the web 52 in a pre-selected pattern.

Figure 4:
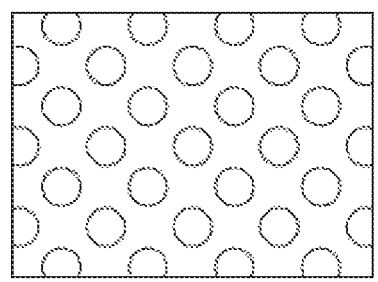
FIG. 4 illustrates one pattern for applying a binder to a basesheet.
Figure 5:
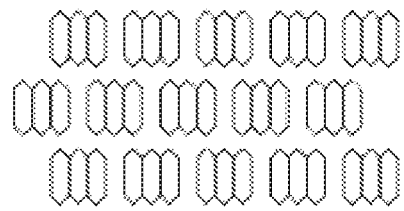
FIG. 5 illustrates another pattern for applying a binder to a basesheet.
Figure 6:
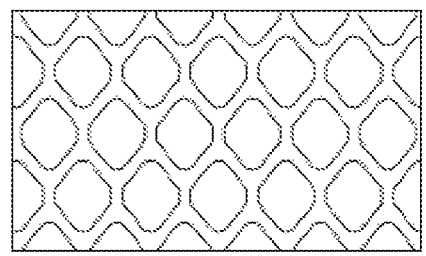
FIG. 6 illustrates still another pattern for applying a binder to a basesheet.

FIGS. 4-6 illustrate several different print patterns that may be used for applying a binder material to a basesheet in accordance with this invention. As illustrated in FIG. 4, the pattern may comprise a succession of discrete dots. In one embodiment, for instance, the dots can be spaced so that there are approximately from about 25 to about 35 dots per inch (25.4 mm) in the machine direction and/or the cross-machine direction. The dots can have a diameter, for example, of from about 0.01 inch (0.25 mm) to about 0.03 inch (0.76 mm). In one particular embodiment, the dots can have a diameter of about 0.02 inch (0.51 mm) and can be present in the pattern so that approximately 28 dots per inch (25.4 mm) extend in both the machine direction and the cross-machine direction. Besides dots, various other discrete shapes such as elongated ovals or rectangles can also be used when printing the binder material onto the sheet.

FIG. 5 shows a print pattern in which the binder material print pattern is made up of discrete multiple deposits that are each comprised of three elongated hexagons. In one embodiment, each hexagon can be about 0.02 inch (0.51 mm) long and can have a width of about 0.006 inch (0.15 mm). Approximately 35 to 40 deposits per inch (25.4 mm) can be spaced in the machine direction and the cross-machine direction.

FIG. 6 illustrates an alternative binder material pattern in which the binder material is printed onto the sheet in a reticulated pattern. The dimensions are similar to those of the dot pattern of FIG. 4. Reticulated patterns, which provide a continuous network of binder material, may result in relatively greater sheet strength than comparable patterns of discrete elements, such as the dot pattern of FIG. 4. It will be appreciated that many other patterns, in addition to those illustrated above, can also be used depending on the desired properties of the final product.

With reference again to FIG. 3, after the binder material 70 is applied, the sheet 52 is adhered to a heated creping cylinder 75 by a press roll 76. The sheet 52 is carried on the surface of the heated creping cylinder 75 for a distance and then removed therefrom by the action of a creping blade 78. The creping blade 78 performs a controlled pattern creping operation on the side of the sheet 52 to which the binder material 70 was applied.

Once creped, the sheet 52 is pulled through an optional drying station 80. The drying station can include any form of a heating unit, such as an oven energized by infrared heat, microwave energy, hot air, or the like. Alternatively, the drying station may comprise other drying methods such as photo-curing, UV-curing, corona discharge treatment, electron beam curing, curing with reactive gas, curing with heated air such as through-air heating or impingement jet heating, infrared heating, contact heating, inductive heating, microwave or RF heating, and the like. Depending upon the binder material selected, however, drying station 80 may not be needed. Once passed through the drying station 80, the sheet 52 can be wound into a roll of material or product 85.

In certain instances, the binder composition may be selected not only to assist in creping the web but also for improving one or more physical properties of the web such as, for example, dry strength, wet strength, stretchability, and tear resistance. Particular binder compositions that may be used in the present invention include latex compositions. The latex composition may comprise a non-carboxylated latex emulsion or a carboxyl-functional latex emulsion polymer. Non-carboxylated latex emulsions useful in the present invention may comprise an aqueous polymer dispersion of vinyl acetate and ethylene. Suitable non-carboxylated latex emulsions include vinyl acetate and ethylene emulsions such as Vinnapas™ EZ123, commercially available from Wacker Polymers, LP (Allentown, PA). In other instances, the binder composition may comprise a carboxyl-functional latex polymer such as Vinnapas™ EP1133, commercially available from Wacker Polymers, LP (Allentown, PA).

Latex polymers useful in the present invention may comprise unsaturated monomers, such as vinyl acetate and ethylene monomers, polymerized in the presence of surfactants and initiators to produce emulsion-polymerized polymer particles. Unsaturated monomers contain carbon-to-carbon double bond unsaturation and generally include vinyl monomers, styrenic monomers, acrylic monomers, allylic monomers, acrylamide monomers, as well as carboxyl functional monomers. Vinyl monomers include vinyl esters such as vinyl acetate, vinyl propionate and similar vinyl lower alkyl esters, vinyl halides, vinyl aromatic hydrocarbons such as styrene and substituted styrenes, vinyl aliphatic monomers such as alpha olefins and conjugated dienes, and vinyl alkyl ethers such as methyl vinyl ether and similar vinyl lower alkyl ethers. Acrylic monomers include lower alkyl esters of acrylic or methacrylic acid having an alkyl ester chain from one to twelve carbon atoms as well as aromatic derivatives of acrylic and methacrylic acid. Useful acrylic monomers include, for instance, methyl, ethyl, butyl, and propyl acrylates and methacrylates, 2-ethyl hexyl acrylate and methacrylate, cyclohexyl, decyl, and isodecyl acrylates and methacrylates, and similar various acrylates and methacrylates.

In certain embodiments the latex polymers may comprise a carboxyl-functional latex polymer comprising copolymerized carboxyl-functional monomers such as acrylic and methacrylic acids, fumaric or maleic or similar unsaturated dicarboxylic acids, where the preferred carboxyl monomers are acrylic and methacrylic acid. In certain instances, the carboxyl-functional latex polymers may comprise by weight from about 1 to about 50 percent copolymerized carboxyl monomers with the balance being other copolymerized ethylene monomers. Suitable carboxyl-functional latex polymers include carboxylated vinyl acetate-ethylene polymer emulsions such as Vinnapas™ EP1133, commercially available from Wacker Polymers, LP (Allentown, PA).

In certain instances, the binder composition may optionally contain an anti-blocking additive designed to modify the surface chemistry or characteristics of the binder film on the basesheet. Suitable anti-blocking additives generally do not react chemically with the binder and may include: 1) surfactants, including anionic surfactants such as sodium and potassium salts of stearic, palmitic, oleic, lauric, and tall oil fatty acids, and non-ionic surfactants such as polyoxyethylene glycols reacted to a lyophilic compound; 2) non-reactive additives, such as silicones, waxes, oils, designed to modify the surface chemistry of at least one outer surface of the web to reduce blocking; and 3) soluble or insoluble crystals, such as sugars, talc, clay, and the like, designed to reside on the surface of the binder film and thus reduce its propensity to cause blocking to an adjacent web surface. The amount of the anti-blocking additive in the binder composition, relative to the amount of carboxyl-functional latex emulsion polymer on a weight percent solids basis, can be from about 1 to about 25 percent, more specifically from about 5 to about 20 percent and more specifically from about 10 to about 15 percent.

Accordingly, in certain embodiments, binders useful in the present invention may consist essentially of a non-crosslinked latex polymer, such as a vinyl acetate-ethylene latex polymer, and optionally an anti-blocking agent, such as a polysaccharide, to prevent blocking upon drying of the tissue web.

In certain preferred embodiments it may be desirable to form the inventive tissue products using a binder that is substantially free from polyfunctional aldehydes, such as glyoxalated polyacrylamide and glyoxal, and azetidinium-functional cross-linking polymers, such as polyamide-epichlorohydrin (PAE) resins and polyamide-polyamine-epichlorohydrin (PPE) resins. Thus, in a preferred embodiment the latex polymer, which may comprise either a non-carboxylated or a carboxylated latex polymer, is not subjected to crosslinking before or after it is applied to the tissue web.

While in certain embodiments it may be desirable that the latex polymer not be crosslinked before or after it is applied to the tissue web, the invention is not so limited. In other embodiments, the binder may comprise a carboxyl-functional latex emulsion polymer that has been reacted with an azetidinium-functional cross-linking polymer, such as a polyamide-epichlorohydrin (PAE) resins or a polyamide-polyamine-epichlorohydrin (PPE) resin. Cross-linked carboxyl-functional latex suitable for use as a binder in the manufacture of inventive tissue products are disclosed in U.S. Pat. No. 7,297,231, the contents of which are incorporated herein in a manner consistent with the present disclosure.

In certain instances, the binder composition may be applied to the base web in a preselected pattern. In one embodiment, for instance, the binder composition can be applied to the web in a reticular pattern, such that the pattern is interconnected forming a net-like design or grid on the surface. In other embodiments the binder composition may be applied to the web in a pattern that represents a succession of discrete shapes. For example, the binder composition may be applied in a pattern of discrete dots. Despite consisting of discrete shapes, such patterns provide the desired physical properties without covering a substantial portion of the surface area of the web.

In certain preferred embodiments the binder composition is applied to only one side of the web so as to cover from about 15 to about 75 percent of the surface area of the web. More particularly, in most applications, the binder composition will cover from about 20 to about 60 percent of the surface area of the web. The total amount of binder composition applied to the web can be in the range of from about 1 to about 25 percent by weight, such as from about 2 to about 10 percent by weight, based upon the total weight of the web.

In the embodiment shown in FIG. 3 only one side of the web is treated with a binder composition leaving an untreated side. Leaving one side of the tissue web untreated may provide various benefits and advantages under some circumstances. For instance, the untreated side may increase the ability of the tissue web to absorb liquids faster. Further, the untreated side may have a greater texture than if the side were treated with a binder composition.

Further, the process illustrated in FIG. 3 represents only one possible method for applying a binder composition to the web. Other applications methods may be suitable for applying a binder composition to the web. For example, various printing methods can be used to print the binder composition onto the web depending upon the particular application. Such printing methods can include direct gravure printing, offset gravure printing, or flexographic printing.

In addition to having a binder composition applied to one or more outer surfaces, as described above, the tissue product may be subjected to additional converting, such as calendering, treatment with a softening composition, embossing, slitting, winding and/or folding.

In certain embodiments tissue products of the present invention may be treated with a softening composition to improve the hand feel or deliver a benefit to the end user. As used herein, the term "softening composition" refers to any chemical composition which improves the tactile sensation perceived by the end user who holds a particular tissue product and rubs it across the skin. Suitable softening compositions include, for example, basic waxes such as paraffin and beeswax and oils such as mineral oil and silicone oil as well as petrolatum and more complex lubricants and emollients such as quaternary ammonium compounds with long alkyl chains, functional silicones, fatty acids, fatty alcohols and fatty esters.

Accordingly, in one embodiment the tissue products of the present invention may be treated with a softening composition comprising one or more oils, such as mineral oil, waxes, such as paraffin, or plant extracts, such as chamomile and aloe vera, such as disclosed in U.S. Pat. Nos. 5,885,697 and 5,525,345, the contents of which are incorporated herein in a manner consistent with the present disclosure.

In other embodiments the tissue products may be treated with a softening composition comprising a polysiloxane, and more preferably with a composition comprising an amino-functional polysiloxane, a surfactant and optionally a skin conditioning agent, such as the compositions disclosed in U.S. Publication No. 2006/0130989, the contents of which are incorporated herein in a manner consistent with the present disclosure. In certain preferred embodiments the polysiloxane is an amino-functional polysiloxane, the surfactant is an ethoxylated alcohol or an ethoxylated propoxylated alcohol and the skin conditioning agent is vitamin E and/or aloe vera.

All of the foregoing softening compositions may optionally contain a beneficial agent, such as a skin conditioning agent or a humectant, which may be provided in an amount ranging from about 0.01 to about 5 percent by weight of the composition. Suitable humectants include lactic acid and its salts, sugars, ethoxylated glycerin, ethoxylated lanolin, corn syrup, hydrolyzed starch hydrolysate, urea, and sorbitol. Suitable skin conditioning agents include allantoin, kaolin, zinc oxide, aloe vera, vitamin E, petrolatum and lanolin. Again, the foregoing additives are generally complementary to the softening compositions of the present invention and generally do not significantly and adversely affect important tissue product properties, such as strength or absorbency of the tissue product, or negatively affect the softening provided by the softening compositions of the present invention.

The foregoing softening compositions are generally applied to one or two outermost surfaces of a dry tissue web and more preferably a creped tissue web having a binding composition disposed on at least one outer surface. The method by which the softening composition is applied to the tissue sheet may be accomplished by any method known in the art. For example, in one embodiment the composition may be applied by contact printing methods such as gravure, offset gravure, flexographic printing, and the like. The contact printing methods often enable topical application of the composition to the tissue sheet. In other embodiments the softening composition may be applied to the tissue web by non-contact printing methods such as ink jet printing, digital printing of any kind, and the like.

In certain preferred embodiments the softening composition may be prepared as an aqueous solution and applied to the web by spraying or rotogravure printing. It is believed in this manner that tactile softness of the tissue sheet and resulting tissue products may be improved due to presence of the softening composition on the surface of the tissue product. When applied as an aqueous solution, the softening composition may comprise from about 50 to about 90 weight percent, by weight of the composition, water and more preferably from about 60 to about 80 percent.

In other instances, the basesheets prepared as described above may be subjected to plying to produce the inventive tissue products. For example, the tissue products of the present invention may be provided as multi-ply products comprising two or more plies, such as two, three or four plies, where the plies are mechanically joined together by crimping or the like. When plying multiple plies together the individual plies may be brought into facing arrangement with one another such that the ply second surface having a binder composition disposed thereon may face one another and the product surface contacted by the user in-use comprises a creping composition. The product may also be cut and into individual sheets, folded and packaged in a carton to be dispensed as individual sheets.

TEST METHODS

Basis Weight

Prior to testing, all samples are conditioned under TAPPI conditions (23±1° C. and 50±2 percent relative humidity) for a minimum of 4 hours, Basis weight of sample is measured by selecting twelve (12) products (also referred to as sheets) of the sample and making two (2) stacks of six (6) sheets. In the event the sample consists of perforated sheets of bath or towel tissue, the perforations must be aligned on the same side when stacking the usable units. A precision cutter is used to cut each stack into exactly 10.16×10.16 cm (4.0×4.0 inch) squares. The two stacks of cut squares are combined to make a basis weight pad of twelve (12) squares thick. The basis weight pad is then weighed on a top loading balance with a minimum resolution of 0.01 grams. The top loading balance must be protected from air drafts and other disturbances using a draft shield. Weights are recorded when the readings on the top loading balance become constant. The mass of the sample (grams) per unit area (square meters) is calculated and reported as the basis weight, having units of grams per square meter (gsm).

Caliper

Caliper is measured in accordance with TAPPI test methods Test Method T 580 pm-12 "Thickness (caliper) of towel, tissue, napkin and facial products." The micrometer used for carrying out caliper measurements is an Emveco 200-A Tissue Caliper Tester (Emveco, Inc., Newberg, OR). The micrometer has a load of 2 kilo-Pascals, a pressure foot area of 2,500 square millimeters, a pressure foot diameter of 56.42 millimeters, a dwell time of 3 seconds and a lowering rate of 0.8 millimeters per second.

Slough

The Slough test provides a quantitative measure of the abrasion resistance of a tissue sample. More specifically, the test measures the resistance of a material to an abrasive action when the material is subjected to a horizontally reciprocating surface abrader. The equipment used to measure Slough is similar to that described in U.S. Pat. No. 6,808,595, the disclosure of which is incorporated by reference herein in a manner consistent with the present invention. The abrading spindle consists of a stainless-steel rod, approximately 1.25 cm (0.495 inches) in diameter and 15.25 cm (6 inches) in length. The abrasive portion of the abrading spindle is 10.8 cm (4.25 inches) in length and consists of 18/22 abrasion coating (commercially available from Superabrasives, Inc., Wixom, MI) applied around the entire circumference of the abrading spindle. The abrading spindle is mounted perpendicularly to the face of the instrument such that the abrasive portion of the abrading spindle extends out its entire distance from the face of the instrument. On each side of the abrading spindle is located a pair of clamps, one movable and one fixed. The clamps are spaced 10 cm (4 inches) apart and centered about the abrading spindle. The movable clamp (weighing approximately 21 grams) is allowed to slide freely in the vertical direction, the weight of the movable clamp providing the means for ensuring a constant is tension of the tissue sheet sample over the surface of the abrading spindle. Instruments for measuring Slough according to the present invention are available at Accelerated Analytical Laboratories (Milwaukee, WI).

Prior to testing, any loose dust should be removed from the abrading spindle with compressed air. If other debris is present on the abrading spindle, the spindle may be washed in warm water and dish detergent, rinsed with distilled water and dried in an oven. In the event the abrading spindle is washed prior to use, care must be taken to ensure that all cleaning solution is rinsed from the abrading spindle and that it is completely dry before use.

Figure 7:
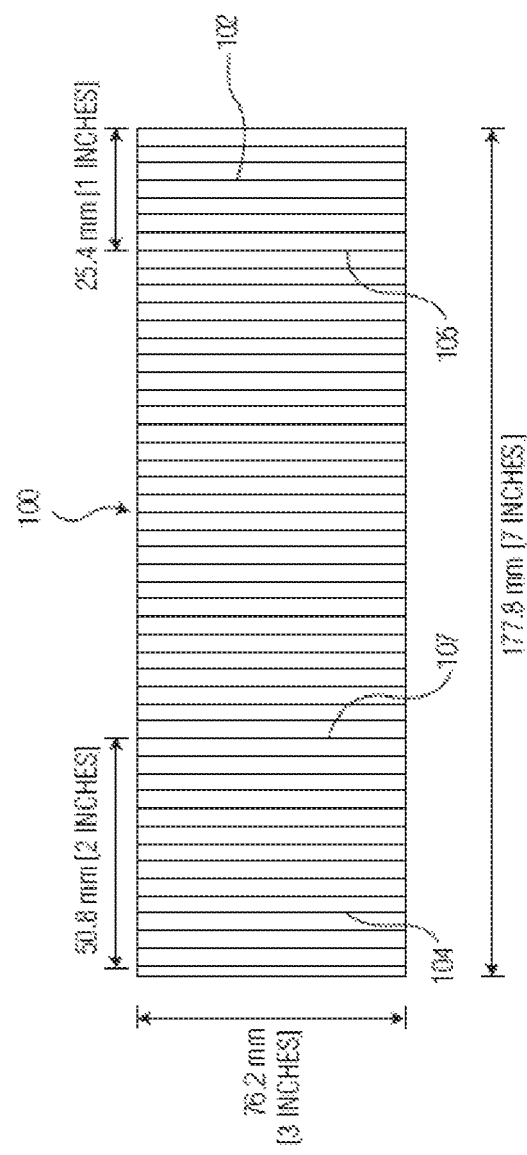
FIG. 7 illustrates a test specimen prepared for Slough testing.
Figure 8:
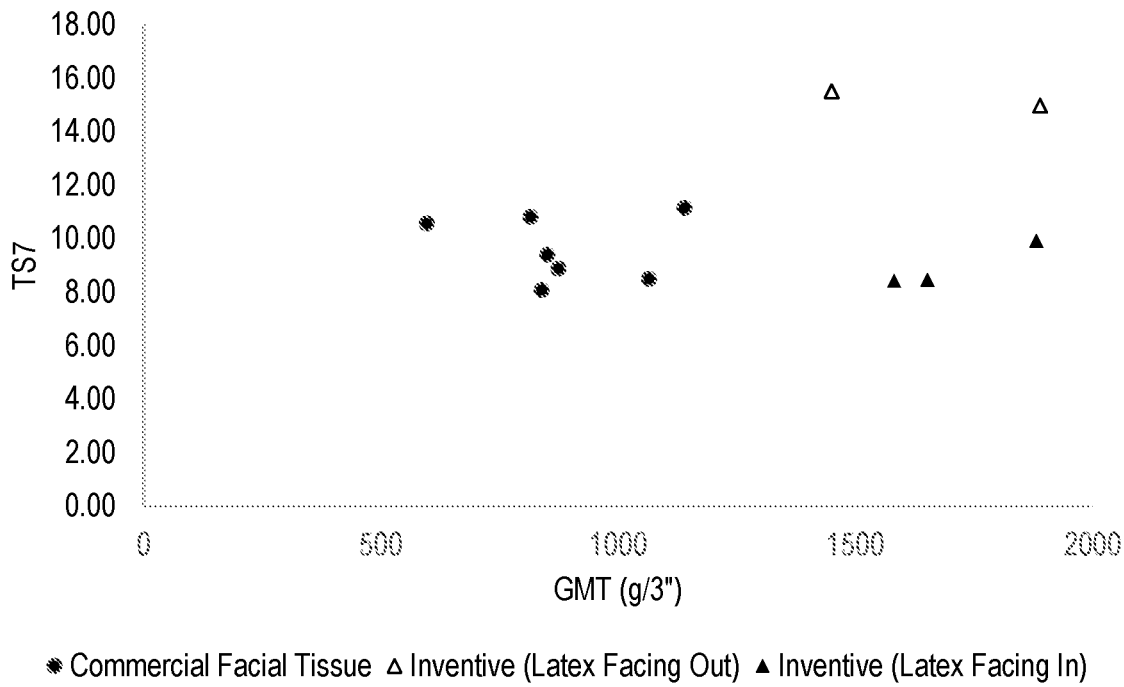
FIG. 8 is a graph of geometric mean tensile strength (GMT, g/3") versus TS7 for commercial facial tissue products (●), inventive tissue products plied such that the latex binder faces inward (▲); and inventive tissue products plied such that the latex binder faces outward (△)
Figure 9:
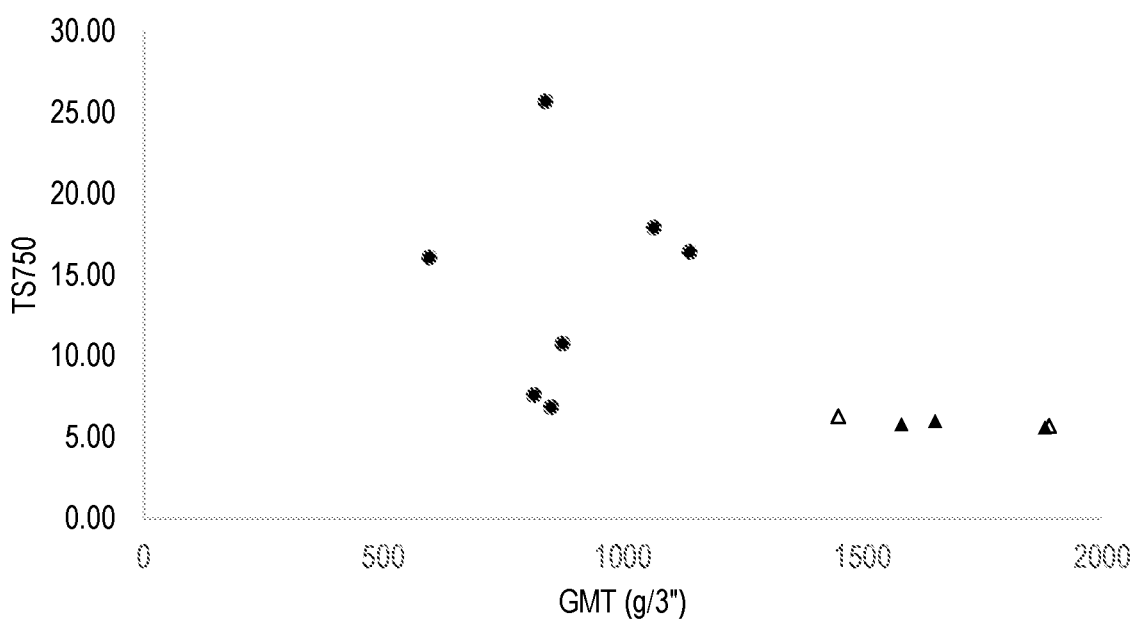
FIG. 9 is a graph of geometric mean tensile strength (GMT, g/3") versus TS750 for commercial facial tissue products (●), inventive tissue products plied such that the latex binder faces inward (▲); and inventive tissue products plied such that the latex binder faces outward (△)
Figure 10:
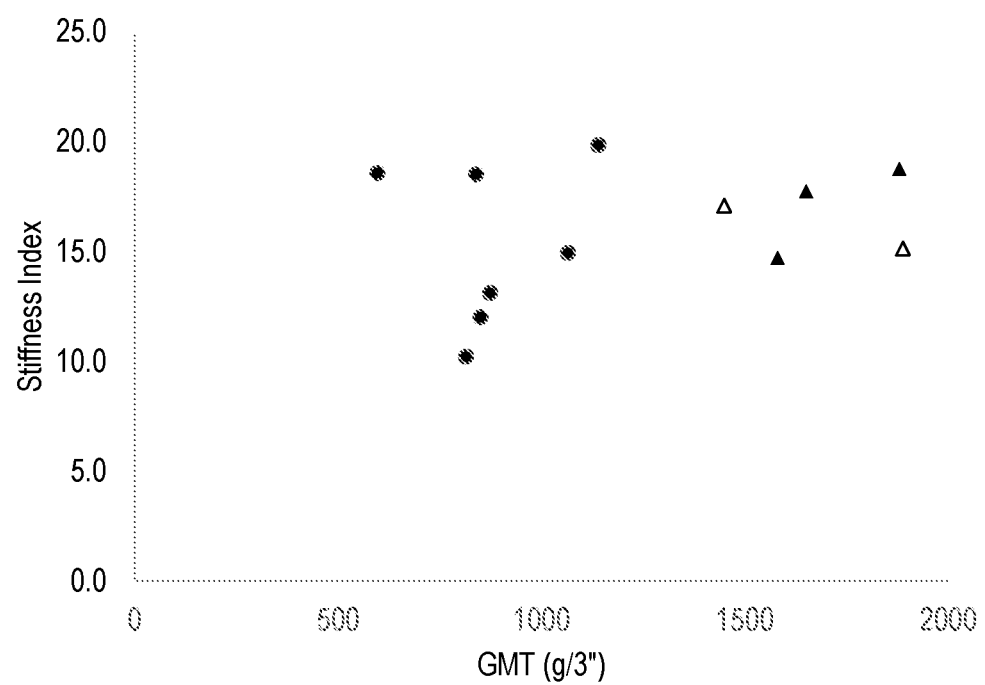
FIG. 10 is a graph of geometric mean tensile strength (GMT, g/3") versus Stiffness Index for commercial facial tissue products (●), inventive tissue products plied such that the latex binder faces inward (▲); and inventive tissue products plied such that the latex binder faces outward (△).

Samples are conditioned under TAPPI conditions (23±1° C. and 50±2 percent relative humidity) for a minimum of 4 hours prior to testing. For perforated bath tissue products, samples are first prepared by unrolling the tissue and separating into lengths of 3 sheets. Using a precision cutter, such as a JDC-3 cutter (commercially available from Thwing-Albert Instrument Company, Philadelphia, PA), each sample is cut to a size of 177.8±13 mm (7.0±0.5 inches) in the machine direction (MD) by 76.2±1 mm (3.0±0.04 inches) in the cross-machine direction (CD). When cutting perforated bath tissue products, as illustrated in FIG. 7, the sample 100 is cut such that a first end 102 extends 25.4 mm (1 inch) beyond a first line of perforations 105 and a second end 104 extends 50.8 mm (2 inches) beyond a second line of perforations 107 to ensure that the spindle does not abrade over the perforations 105, 107 in the sample 100.

When testing rolled and perforated bath tissue products testing should be done on the outside surface of the roll as it is unwound. Generally rolled and perforated bath tissue products are not separated. into individual plies prior to testing and the outer surface of the product, as it is unwound from the roll, is tested. When testing folded facial tissue products, the product is separated into individual plies and the outward facing side of one of the outer plies is tested.

Each tissue sheet sample is weighed to the nearest 0.1 mg. One end of the tissue sheet sample is clamped to the fixed clamp, the sample is then loosely draped over the abrading spindle and clamped into the sliding clamp. The entire width of the sample should be in contact with the abrading spindle. The sliding clamp is then allowed to fall providing constant tension across the abrading spindle. The entire width of the tissue sheet sample should be in contact with the abrading spindle.

Once the sample is secured the test begins by moving the abrading spindle back and forth at an approximate 15-degree angle from the centered vertical centerline in a reciprocal horizontal motion against the tissue sample for 40 cycles at a speed of 73.5±0.5 cycles per minute. As the spindle cycles, it is also rotated counterclockwise (when looking at the front of the instrument) at an approximate speed of 5 RPMs. Once the 40 cycles are complete, the tissue sample is removed from the jaws with the fingertips and both sides of the sample are blown with air having a flow rate of approximately 3.4 scfm for approximately 13 seconds to remove debris.

The tissue sheet sample is then weighed to the nearest 0.1 mg and the weight loss calculated. The difference between the initial weight and the weight after testing is the amount of Slough. Ten samples are tested and the average weight loss value in milligrams (mg) is recorded, which is the Slough value for the sample.

Tensile

Tensile testing is conducted on a tensile testing machine maintaining a constant rate of elongation and the width of each specimen tested is 3 inches. Testing is conducted under TAPPI conditions. Prior to testing samples are conditioned under TAPPI conditions (23±1° C. and 50±2 percent relative humidity) for at least 4 hours and then cutting a 3±0.05 inches (76.2±1.3 mm) wide strip in either the machine direction (MD) or cross-machine direction (CD) orientation using a JDC Precision Sample Cutter (Thwing-Albert Instrument Company, Philadelphia, PA, Model No. JDC 3-10, Serial No. 37333) or equivalent. The instrument used for measuring tensile strengths was an MTS Systems Sintech 11S, Serial No. 6233. The data acquisition software was MTS TestWorks® for Windows Ver. 3.10 (MTS Systems Corp., Research Triangle Park, NC). The load cell was selected from either a 50 Newton or 100 Newton maximum, depending on the strength of the sample being tested, such that the majority of peak load values fall between 10 to 90 percent of the load cell's full-scale value. The gauge length between jaws was 4±0.04 inches (101.6±1 mm) for facial tissue and towels and 2±0.02 inches (50.8±0.5 mm) for bath tissue. The crosshead speed was 10±0.4 inches/min (254±1 mm/min), and the break sensitivity was set at 65 percent. The sample was placed in the jaws of the instrument, centered both vertically and horizontally. The test was then started and ended when the specimen broke. The peak load was recorded as either the "MD tensile strength" or the "CD tensile strength" of the specimen depending on direction of the sample being tested. Ten representative specimens were tested for each product or sheet and the arithmetic average of all individual specimen tests was recorded as the appropriate MD or CD tensile strength having units of grams per three inches (g/3"). Tensile energy absorbed (TEA) and slope are also calculated by the tensile tester. TEA is reported in units of g·cm/cm$^2$ and slope is recorded in units of kilograms (kg). Both TEA and Slope are directionally dependent and thus MD and CD directions are measured independently.

All products were tested in their product forms without separating into individual plies. For example, a 2-ply product was tested as two plies and recorded as such. In the tensile properties of basesheets were measured, the number of plies used varied depending on the intended end use. For example, if the basesheet was intended to be used for 2-ply product, two plies of basesheet were combined and tested.

Wet CD Tensile

Wet tensile strength measurements are measured in the same manner as described for dry tensile above, but after the center portion of the previously conditioned sample strip has been saturated with distilled water immediately prior to loading the specimen into the tensile test equipment. Sample wetting is performed by first laying a single test strip onto a piece of blotter paper (Fiber Mark, Reliance Basis 120). A pad is then used to wet the sample strip prior to testing. The pad is a green, Scotch-Brite brand (3M) general purpose commercial scrubbing pad. To prepare the pad for testing, a full-size pad is cut approximately 2.5 inches long by 4 inches wide. A piece of masking tape is wrapped around one of the 4 inch long edges. The taped side then becomes the "top" edge of the wetting pad. To wet a tensile strip, the tester holds the top edge of the pad and dips the bottom edge in approximately 0.25 inches of distilled water located in a wetting pan. After the end of the pad has been saturated with water, the pad is then taken from the wetting pan and the excess water is removed from the pad by lightly tapping the wet edge three times across a wire mesh screen. The wet edge of the pad is then gently placed across the sample, parallel to the width of the sample, in the approximate center of the sample strip. The pad is held in place for approximately one second and then removed and placed back into the wetting pan. The wet sample is then immediately inserted into the tensile grips, so the wetted area is approximately centered between the upper and lower grips. The test strip should be centered both horizontally and vertically between the grips. (It should be noted that if any of the wetted portion comes into contact with the grip faces, the specimen must be discarded, and the jaws dried off before resuming testing.) The tensile test is then performed, and the peak load recorded as the wet CD tensile strength of this specimen. As with the dry CD tensile test, the characterization of a product is determined by the average of ten representative sample measurements.

Tissue Softness Analyzer

Softness and surface smoothness were measured using an EMTEC Tissue Softness Analyzer ("TSA") (Emtec Electronic GmbH, Leipzig, Germany). The TSA comprises a rotor with vertical blades which rotate on the tissue sample applying a defined contact pressure. The blades are pressed against the sample with a load of 100 mN and the rotational speed of the blades is two revolutions per second. Contact between the vertical blades and the tissue sample creates vibrations, which are sensed by a vibration sensor. The sensor transmits a signal to a PC for processing and display. The signal is displayed as a frequency spectrum. The frequency spectrum is analyzed by the associated TSA software to determine the amplitude of the frequency peak occurring in the range between 200 to 1000 Hz. This peak is generally referred to as the TS750 value (having units of dB V$^2$ rms) and represents the surface smoothness of the tissue sample. A high amplitude peak correlates to a rougher surface, while a low amplitude peak correlates a smoother surface. A further peak in the frequency range between 6 and 7 kHZ represents the softness of the sample. The peak in the frequency range between 6 and 7 kHZ is herein referred to as the TS7 value (having units of dB V$^2$ rms). The lower the amplitude of the peak occurring between 6 and 7 kHZ, the softer the sample.

Tissue product samples were prepared by cutting a circular sample having a diameter of 112.8 mm. All samples were allowed to equilibrate at TAPPI conditions for at least 24 hours prior to completing the TSA testing. After conditioning each sample was tested as-is, i.e., multi-ply products were tested without separating the sample into individual plies. The sample is secured, and the measurements are started via the PC. The PC records, processes and stores all of the data according to standard TSA protocol. The reported TS750 and TS7 values are the average of five replicates, each one with a new sample.

EXAMPLES

Wet pressed tissue products were produced substantially as illustrated in FIG. 1. Initially, northern softwood kraft (NSWK) pulp was dispersed in a pulper for 30 minutes at 4 percent consistency at about 100° F. The NSWK pulp was then transferred to a dump chest and subsequently diluted to approximately 3 percent consistency. The NSWK pulp was refined at about 1 HP-days/MT. NSWK pulp was then pumped to a machine chest and mixed with 2 kg/MT of Kymene® 920A (Ashland Water Technologies, Wilmington, DE) and 1 kg/MT Baystrength 3000 (Kemira, Atlanta, GA). From the machine chest the NSWK pulp was pumped to the headbox where it formed the middle side layer of a 3-layer tissue basesheet. The NSWK pulp made up approximately 32 percent of the fiber mass of the base sheet.

Eucalyptus hardwood kraft (EHWK) pulp was dispersed in a pulper for 30 minutes at about 4 percent consistency at about 100° F. The EHWK pulp was then transferred to a dump chest and diluted to about 3 percent consistency. The EHWK pulp fibers were then pumped to a machine chest where they were mixed with 2 kg/MT of Kymene® 920A. From the machine chest the EHWK pulp was pumped to the headbox where it formed the dryer and felt layers of the 3-layer tissue basesheet.

The pulp fibers were pumped from their respective machine chests to the headbox at a consistency of about 0.1 percent. The fibers were deposited onto a felt using a Crescent Former.

The wet sheet, about 10 to 20 percent consistency, was adhered to a Yankee dryer, traveling at about 2000 fpm (610 mpm) through a nip via a pressure roll. The consistency of the wet sheet after the pressure roll nip (post-pressure roll consistency or PPRC) was approximately 40 percent. The wet sheet is adhered to the Yankee dryer due to the creping composition that is applied to the dryer surface.

The creping compositing comprised a non-fibrous olefin dispersion, sold under the trade name HYPOD 8510 (Dow Chemical Co., Midland, MI) was also evaluated. The HYPOD 8510 was prepared at 30 percent solids and delivered at a total addition of about 150 mg/m² spray coverage on the Yankee Dryer. A spray boom situated underneath the Yankee dryer sprayed the creping composition onto the dryer surface.

The sheet was dried to about 98 to 99 percent consistency as it traveled on the Yankee dryer and to the creping blade. The creping blade subsequently scraped the tissue sheet and a portion of the creping composition off the Yankee dryer. The creped tissue basesheet was then wound onto a core traveling at about 1575 fpm (480 mpm) into soft rolls for further treatment.

Soft rolls of the creped tissue basesheet were unwound and fed to a gravure printing line, similar to that shown in FIG. 3, traveling at about 1,000 feet per minute where a latex polymer was printed onto the surface of the sheet. The binder composition was Vinnapas™ EP1133 (commercially available from Wacker Polymers, LP, Allentown, PA). The pH of the latex-based binder was adjusted using NaOH to a pH of approximately 6.0 and allowed to mix for approximately 5-30 minutes prior to use in the gravure printing operation. The viscosity of the latex-based binder was in range from 30-60 cps when measured at room temperature using a viscometer (Brookfield™ Synchro-lectric viscometer Model RVT, Brookfield Engineering Laboratories Inc. Stoughton, MA) with a #1 spindle operating at 20 rpm.

The second side of the creped basesheet, i.e., the side without creping composition, was printed with a binding composition using direct rotogravure printing in a pattern as shown in FIG. 5. The pattern comprises three elongated hexagons having a length of about 0.02 inch (0.51 mm) and a width of about 0.006 inch (0.15 mm). The print nip distance was varied from 7.0 to 12.0 mm. After printing, the sheet was pressed against and doctored off a rotating drum, which had a surface temperature of approximately 126° C.

The print creped tissue web was subjected to further converting to produce a two-ply tissue product by calendering at a pressure of 10 psi and arranging the individual plies in facing relation such that the surface printed with the binder composition formed the two outer surfaces of the two-ply tissue product. Mechanical crimping on the edges of the structure held the plies together. The plied sheet was then slit on the edges to a standard width of approximately 8.5 inches and cut to facial tissue length. The finished product which was subject to physical testing as summarized in Tables 2-4, below.

TABLE 2

| | Basis Weight (gsm) | Caliper (um) | GMT (g/3") | MD Slope (kg) | CD Tensile (g/3") | CD Stretch (%) | CD TEA (g · cm/cm²) | CD Slope (kg) |
|---|---|---|---|---|---|---|---|---|
| Sample 1 | 38.3 | 251 | 1450 | 7.44 | 937 | 13.4 | 14.64 | 11.10 |
| Sample 2 | 38.0 | 234 | 1890 | 8.77 | 1214 | 14.4 | 19.86 | 13.14 |
| Sample 3 | 38.3 | 250 | 1582 | 7.38 | 1004 | 14.2 | 16.86 | 11.43 |
| Sample 4 | 38.9 | 233 | 1652 | 8.11 | 1055 | 15.1 | 18.61 | 12.10 |
| Sample 5 | 38.4 | 227 | 1881 | 7.72 | 1201 | 13.7 | 19.20 | 14.32 |

TABLE 3

| | CD TEA (g · cm/cm²) | TEA Index | GM Slope (kg) | Stiffness Index | GM Stretch (%) | TS7 | TS750 | Slough (mg) |
|---|---|---|---|---|---|---|---|---|
| Sample 1 | 24.01 | 1.66 | 9.09 | 6.27 | 19.2 | 15.51 | 17.09 | 0.50 |
| Sample 2 | 32.17 | 1.70 | 10.73 | 5.68 | 20.0 | 14.97 | 15.14 | 0.62 |
| Sample 3 | 26.83 | 1.70 | 9.19 | 5.81 | 19.7 | 8.43 | 14.71 | 0.35 |
| Sample 4 | 28.70 | 1.74 | 9.91 | 6.00 | 19.8 | 8.47 | 17.75 | 1.38 |
| Sample 5 | 31.88 | 1.69 | 10.52 | 5.59 | 20.2 | 9.92 | 18.76 | 1.92 |

TABLE 4

| | CD Wet Tensile (g/3") | Wet/Dry Ratio | Wet Out Time (s) | Absorbent Capacity (g/g) |
|---|---|---|---|---|
| Sample 1 | 267 | 0.28 | 6.18 | 7.9 |
| Sample 2 | 246 | 0.20 | 6.36 | 8.6 |
| Sample 3 | 208 | 0.21 | 5.43 | 8.9 |
| Sample 4 | 230 | 0.22 | 4.91 | 8.4 |
| Sample 5 | 337 | 0.28 | 7.28 | 7.8 |

EMBODIMENTS

First embodiment: A multi-ply tissue product comprising a first wet pressed tissue ply and a second wet pressed tissue ply, the product having a geometric mean tensile strength (GMT) greater than about 1,400 g/3" and a TS7 value less than about 16.0.

Second embodiment: The product of the first embodiment having a Stiffness Index less than about 8.0. In a particularly preferred embodiment, the tissue product has a Stiffness Index from about 5.0 to about 7.0.

Third embodiment: The product of embodiments 1 or 2 wherein each of the first and the second wet pressed tissue plies has a first outer surface and a latex polymer disposed thereon. In a particularly preferred embodiment, the latex polymer is non-crosslinked.

Fourth embodiment: The product of any one of embodiments 1 through 3 wherein each of the first and the second wet pressed tissue plies has a first outer surface and a non-crosslinked vinyl acetate-ethylene polymer and optionally an anti-blocking agent disposed thereon. In certain embodiments the anti-blocking agent may comprise a polysaccharide or a surfactant.

Fifth embodiment: The product of any one of embodiments 1 through 4 having a GMT from about 1,400 to about 2,000 g/3".

Sixth embodiment: The product of any one of embodiments 1 through 5 having TS7 from about 8.0 to about 14.0.

Seventh embodiment: The product of any one of embodiments 1 through 6 having TS750 from about 12.0 to about 20.0.

Eighth embodiment: The product of any one of embodiments 1 through 7 having a geometric mean stretch (GM Stretch) greater than about 15 percent, such as from about 15 to about 20 percent.

Ninth embodiment: The product of any one of embodiments 1-8 having a TEA Index of about 1.5 or greater, such as from about 1.5 to about 2.0.

Tenth embodiment: The product of any one of embodiments 1 through 9 wherein each of the first and the second wet pressed tissue plies has a second outer surface and a creping composition disposed thereon and wherein the first and second wet pressed tissue plies are plied together in facing arrangement such that the second outer surfaces face one another.

Eleventh embodiment: The product of any one of embodiments 1 through 10 having a GM TEA greater than about 20.0 g·cm/cm², such as from about 20 to about 30 g·cm/cm².

Twelfth embodiment: The product of any one of embodiments 1 through 11 having a CD Stretch greater than about 10 percent, such as from about 10 to about 16 percent.

Thirteenth embodiment: The product of any one of embodiments 1 through 12 having a Wet/Dry Ratio greater than about 0.25.

Fourteenth embodiment: The product of any one of embodiments 1 through 13 having a basis weight from about 35 to about 45 grams per square meter (gsm) and a sheet bulk greater than about 8.0 cubic centimeters per gram (cc/g).

Fifteenth embodiment: The product of any one of embodiments 1 through 14 having a GM Slope less than about 12.0 kg.

What is claimed is:

1. A multi-ply tissue product comprising a first wet pressed tissue ply and a second wet pressed tissue ply, wherein each of the first and the second wet pressed tissue plies each have a first outer surface and a latex polymer disposed thereon and wherein each of the first and the second wet pressed tissue plies are plied together such that the first outer surfaces face one another, the product having a geometric mean tensile strength (GMT) greater than about 1,400 g/3", a Stiffness Index from about 5.00 to about 8.00, and a TS7 value less than about 16.0.

2. The product of claim 1 wherein each of the first and the second wet pressed tissue plies each have a first outer surface and a non-crosslinked vinyl acetate-ethylene polymer and optionally an anti-blocking agent disposed thereon.

3. The product of claim 1 having a GMT from about 1,400 to about 2,000 g/3".

4. The product of claim 1 having TS7 from about 8.0 to about 14.0.

5. The product of claim 1 having TS750 from about 12.0 to about 20.0.

6. The product of claim 1 having a geometric mean stretch (GM Stretch) greater than about 15 percent.

7. The product of claim 1 having a TEA Index of about 1.5 or greater.

8. The product of claim 1 having a GM TEA greater than about 20.0 g·cm/cm².

9. The product of claim 1 having a CD Stretch greater than about 10 percent.

10. The product of claim 1 having a Wet/Dry Ratio greater than about 0.20.

11. The product of claim 1 having a basis weight from about 35 to about 45 grams per square meter (gsm) and a sheet bulk greater than about 8.0 cubic centimeters per gram (cc/g).

12. The product of claim 1 having a GM Slope less than about 12.0 kg.

* * * * *